United States Patent
Xia

(10) Patent No.: US 9,008,505 B2
(45) Date of Patent: Apr. 14, 2015

(54) OPTICAL POWER ADJUSTMENT METHOD FOR ETHERNET PASSIVE OPTICAL NETWORK SYSTEM, AND OPTICAL LINE TERMINAL

(75) Inventor: Shundong Xia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 210 days.

(21) Appl. No.: 13/634,521

(22) PCT Filed: Sep. 17, 2010

(86) PCT No.: PCT/CN2010/077075
§ 371 (c)(1),
(2), (4) Date: Sep. 12, 2012

(87) PCT Pub. No.: WO2011/110018
PCT Pub. Date: Sep. 15, 2011

(65) Prior Publication Data
US 2013/0004161 A1  Jan. 3, 2013

(30) Foreign Application Priority Data
Mar. 12, 2010 (CN) .......................... 2010 1 0134573

(51) Int. Cl.
*H04B 10/08* (2006.01)
*H04B 17/00* (2006.01)
(Continued)

(52) U.S. Cl.
CPC ... *H04Q 11/0067* (2013.01); *H04Q 2011/0079* (2013.01); *H04B 10/272* (2013.01); *H04B 2210/08* (2013.01)

(58) Field of Classification Search
CPC .................................................. H04J 14/0221
USPC .................................... 398/43–103, 140–172
See application file for complete search history.

(56) References Cited

U.S. PATENT DOCUMENTS

2004/0037569 A1 * 2/2004 Kamalov et al. ............. 398/162
2004/0057462 A1 * 3/2004 Lim et al. ...................... 370/468
(Continued)

FOREIGN PATENT DOCUMENTS

CN  101471731 A  7/2009
CN  101615956 A  12/2009
(Continued)

OTHER PUBLICATIONS

International Search Report for PCT/CN2010/077075 mailed on Dec. 16, 2010 in 4 pages.

*Primary Examiner* — David Payne
*Assistant Examiner* — Casey Kretzer
(74) *Attorney, Agent, or Firm* — Knobbe, Martens, Olson & Bear, LLP

(57) ABSTRACT

The present invention provides optical power adjustment method for EPON system, and OLT. The method comprises: OLT starting optical power adjustment procedure after ONU or ONT successfully registers, receiving upstream data from the ONU or the ONT (201); during optical power adjustment procedure, OLT detecting whether there is error code in upstream data; if not, notifying the ONU or the ONT to decrease transmission optical power progressively, during progressive decrease procedure, OLT continuing to detect whether there is error code in upstream data (203); if there is error code during progressive decrease procedure, notifying the ONU or the ONT to increase transmission optical power progressively, and during progressive increase procedure, OLT continuing to detect whether there is error code in upstream data (205); if there is no error code during progressive increase procedure, OLT stopping the adjustment (207). Unnecessary optical power consumption in upstream data transmission in EPON system is reduced effectively, therefore power is saved.

16 Claims, 5 Drawing Sheets

(51) Int. Cl.
*H04B 10/00* (2013.01)
*H04Q 11/00* (2006.01)
*H04B 10/272* (2013.01)

(56) References Cited

U.S. PATENT DOCUMENTS

2007/0140258 A1* 6/2007 Tan et al. .............. 370/395.21
2007/0153823 A1* 7/2007 Wojtowicz .............. 370/463
2008/0056714 A1* 3/2008 Konstan .............. 398/38
2008/0304828 A1* 12/2008 Mizutani et al. .............. 398/78
2009/0169209 A1 7/2009 Sugawara et al.

FOREIGN PATENT DOCUMENTS

| | | |
|---|---|---|
| CN | 101646104 A | 2/2010 |
| KR | 20050005602 A | 1/2005 |
| WO | WO 2008/038981 A1 | 4/2008 |

* cited by examiner

| | Number of bytes |
|---|---|
| Destination address = 01-80-c2-00-00-02 | 6 |
| Source address | 6 |
| Length/type = 88-09 [Slow protocol] | 2 |
| Sub-type = 0x03 [OAM] | 1 |
| Flag | 2 |
| Code = 05 [Optical power adjustment OAM PDU] | 1 |
| Optical power level | 1 |
| Pad | 41 |
| Frame check field | 4 |

Fig. 6

| | Number of bytes |
|---|---|
| Destination address = 01-80-c2-00-00-02 | 6 |
| Source address | 6 |
| Length/type = 88-09 [Slow protocol] | 2 |
| Sub-type = 0x03 [OAM] | 1 |
| Flag | 2 |
| Code = 06 [Optical power inquiry OAM PDU] | 1 |
| Pad | 42 |
| Frame check field | 4 |

Fig. 7

|                                                              | Number of bytes |
|--------------------------------------------------------------|-----------------|
| Destination address = 01-80-c2-00-00-02                      | 6               |
| Source address                                               | 6               |
| Length/type = 88-09 [Slow protocol]                          | 2               |
| Sub-type = 0x03 [OAM]                                        | 1               |
| Flag                                                         | 2               |
| Code = 07 [Optical power inquiry response OAM PDU]           | 1               |
| Optical power level                                          | 1               |
| Pad                                                          | 41              |
| Frame check field                                            | 4               |

OPTICAL POWER ADJUSTMENT METHOD FOR ETHERNET PASSIVE OPTICAL NETWORK SYSTEM, AND OPTICAL LINE TERMINAL

CROSS-REFERENCE TO RELATED APPLICATIONS

This application is the U.S. National Phase application under 35 U.S.C. §371 of International Application PCT/CN2010/077075, filed Sep. 17, 2010, which claims priority to Chinese Patent Application 201010134573.5, filed Mar. 12, 2010.

FIELD OF THE INVENTION

The present invention relates to the field of optical network, in particular to an optical power adjustment method for an Ethernet Passive Optical Network (EPON) system, and an Optical Line Terminal (OLT).

BACKGROUND OF THE INVENTION

The EPON is a new generation broadband passive optical integrated access technology based on the Institute of Electrical and Electronics Engineers (IEEE) 802.3-2005 Section 5 Standard. As shown in FIG. 1, the system usually consists of an OLT, an Optical Distribution Network (ODN) and an Optical Network Unit (ONU)/Optical Network Termination (ONT). The OLT provides a network side interface for the EPON system, and the ONU provides a user side interface for the EPON system. The ODN consists of single mode fibers and passive optical devices such as an optical splitter and an optical connector, and provides optical transmission medium for a physical connection between the OLT and the ONU. The ODN is usually of a point-to-multipoint structure, that is, one OLT can be connected with a plurality of ONUs via the ODN. If an ONU directly provides a user port function, for example, an Ethernet user port for Internet use of a personal computer (PC), it is called an ONT.

In one ODN, the optical fiber distances from the ONUs or the ONTs to the OLT are different. Due to the attenuation of the optical fiber transmission line, near ONUs or ONTs can work normally with a relatively low optical power, while far ONUs or ONTs need a relatively high optical power to work normally. In the existing EPON system, in order to make the OLT stably receive data from all ONUs or ONTs, the optical powers of the optical modules of the ONUs or the ONTs are fixedly configured according to the farthest distance supported by the OLT. In this way, for near ONUs or ONTs, the transmission power which meets the requirement of stably receiving data by the OLT is far less than the transmission power fixedly configured according to the farthest distance supported by the OLT, therefore the waste of the optical power is caused.

SUMMARY OF THE PRESENT INVENTION

The present invention provides an optical adjustment method for an EPON system and an OLT, so as to at least solve the above problem.

According to one aspect of the present invention, an optical power adjustment method for an EPON system is provided, comprising: an OLT starting an optical power adjustment procedure after an ONU or an ONT successfully registers; during the optical power adjustment procedure, the OLT detecting whether there is an error code in upstream data from the ONU or the ONT; if there is no error code, notifying the ONU or the ONT to decrease a transmission optical power progressively, and during a progressive decrease procedure, the OLT continuing to detect whether there is an error code in the upstream data; if the OLT detects that there is an error code in the upstream data during the progressive decrease procedure, notifying the ONU or the ONT to increase the transmission optical power progressively, and during a progressive increase procedure, the OLT continuing to detect whether there is an error code in the upstream data; and if the OLT detects that there is no error code in the upstream data during the progressive increase procedure, the OLT stopping an adjustment.

Preferably, an adjustment mode state parameter is set in the OLT, wherein the adjustment mode state parameter comprises: RECOVER, INCREASE and DECREASE.

Preferably, before the step of the OLT starting the optical power adjustment procedure after the ONU or the ONT successfully registers, the method further comprises: initializing the adjustment mode state parameter to RECOVER.

Preferably, before the step of the OLT detecting whether there is an error code in the upstream data from the ONU or the ONT, the method further comprises a step of obtaining a current transmission optical power of the ONU or the ONT, and the step comprises: the OLT transmitting an optical power inquiry frame to the ONU or the ONT; receiving an optical power inquiry response frame returned by the ONU or the ONT; and obtaining the current transmission optical power of the ONU or the ONT from the optical power inquiry response frame.

Preferably, the method further comprises: if no optical power inquiry response frame is received from the ONU or the ONT within a set time, then determining the current transmission optical power of the ONU or the ONT as an upper limit of the transmission optical power.

Preferably, before the step of obtaining the current transmission optical power of the ONU or the ONT, the method further comprises: the OLT stopping the adjustment if detecting that the ONU or the ONT gets offline.

Preferably, the method further comprises: in a case that the ONU or the ONT has not registered and transmits a registration request to the OLT, judging whether a response to the registration request is received from the OLT within a set time; if not, setting the transmission optical power of the ONU or the ONT as an upper limit of the transmission optical power.

Preferably, the step of notifying the ONU or the ONT to decrease the transmission optical power progressively if there is no error code comprises: if the OLT judges that there is no error code in the upstream data, judges that the adjustment mode state parameter is not INCREASE, and judges that the current transmission optical power of the ONU or the ONT is not a lower limit of the transmission optical power of the ONU or the ONT, then the OLT notifying the ONU or the ONT to decrease the transmission optical power by one level, and setting the adjustment mode state parameter as DECREASE; if the OLT judges that there is no error code in the upstream data, judges that the adjustment mode state parameter is not INCREASE, and judges that the current transmission optical power of the ONU or the ONT is the lower limit of the transmission optical power of the ONU or the ONT, then the OLT stopping the adjustment.

Preferably, the step of notifying the ONU or the ONT to increase the transmission optical power progressively if the OLT detects that there is an error code in the upstream data during the progressive decrease procedure comprises: if the OLT detects that there is an error code in the upstream data, and judges that the current transmission optical power of the ONU or the ONT is not an upper limit of the transmission optical power of the ONU or the ONT and the adjustment mode state parameter is not RECOVER, then the OLT notifying the ONU or the ONT to increase the transmission optical power by one level, and setting the adjustment mode state parameter as INCREASE; if the OLT detects that there is an error code in the upstream data and judges that the current transmission optical power of the ONU or the ONT is the upper limit of the transmission optical power of the ONU or the ONT, then the OLT stopping the adjustment; if the OLT detects that there is an error code in the upstream data, and judges that the current transmission optical power of the ONU or the ONT is not the upper limit of the transmission optical power of the ONU or the ONT and the adjustment mode state parameter is RECOVER, then the OLT notifying the ONU or the ONT to adjust the current transmission optical power to the upper limit of the transmission optical power.

Preferably, the step of the OLT stopping the adjustment if the OLT detects that there is no error code in the upstream data during the progressive increase procedure comprises: if the OLT detects that there is no error code in the upstream data and judges that the adjustment mode state parameter is INCREASE, then the OLT stopping the adjustment.

Preferably, the method further comprises: storing the adjusted transmission optical power of the ONU or the ONT; and after the ONU or the ONT is powered-on, setting a current transmission optical power of the ONU or the ONT as the stored transmission optical power.

Preferably, the method further comprises: if the stored adjusted transmission optical power of the ONU or the ONT cannot be obtained after the ONU or the ONT is powered-on, setting the current transmission optical power of the ONU or the ONT as an upper limit of the transmission optical power.

According to another aspect of the present invention, an OLT is provided, comprising: a start module, configured to start an optical power adjustment procedure after an ONU or an ONT successfully registers; a detection module, configured to detect whether there is an error code in upstream data from the ONU or the ONT during the optical power adjustment procedure; and detect whether there is an error code in the upstream data during a progressive decrease procedure and a progressive increase procedure; a decrease module, configured to notify the ONU or the ONT to decrease the transmission optical power progressively if there is no error code in the upstream data; an increase module, configured to notify the ONU or the ONT to increase the transmission optical power progressively if the detection module detects that there is an error code in the upstream data during the progressive decrease procedure; and a stop module, configured to stop an adjustment if the detection module detects that there is no error code in the upstream data during the progressive increase procedure.

Preferably, an adjustment mode state parameter is set in the OLT, wherein the adjustment mode state parameter comprises: RECOVER, INCREASE and DECREASE.

Preferably, the OLT further comprises: an optical power obtaining module, configured to obtain a current transmission optical power of the ONU or the ONT before the detection module detects whether there is an error code in the upstream data from the ONU or the ONT.

Preferably, the decrease module comprises: a first decrease module, configured to: when there is no error code in the upstream data, the adjustment mode state parameter is not INCREASE, and the current transmission optical power of the ONU or the ONT is not a lower limit of the transmission optical power of the ONU or the ONT, notify the ONU or the ONT to decrease the transmission optical power by one level and set the adjustment mode state parameter as DECREASE; and a second decrease module, configured to: when there is no error code in the upstream data, the adjustment mode state parameter is not INCREASE, and the current transmission optical power of the ONU or the ONT is the lower limit of the transmission optical power of the ONU or the ONT, stop the adjustment.

Preferably, the increase module comprises: a first increase module, configured to: when there is an error code in the upstream data, the current transmission optical power of the ONU or the ONT is not an upper limit of the transmission optical power of the ONU or the ONT, and the adjustment mode state parameter is not RECOVER, notify the ONU or the ONT to increase the transmission optical power by one level and set the adjustment mode state parameter as INCREASE; a second increase module, configured to: when there is an error code in the upstream data and the current transmission optical power of the ONU or the ONT is an upper limit of the transmission optical power of the ONU or the ONT, stop the adjustment; and a third increase module, configured to: when there is an error code in the upstream data, the current transmission optical power of the ONU or the ONT is not the upper limit of the transmission optical power of the ONU or the ONT, and the adjustment mode state parameter is RECOVER, notify the ONU or the ONT to adjust the current transmission optical power to the upper limit of the transmission optical power.

Preferably, the OLT further comprises: a transmitting-at-upper-limit module, configured to set the transmission optical power of the ONU or the ONT as an upper limit of the transmission optical power, in a case that the ONU or the ONT has not registered and transmits a registration request to the OLT and no response to the registration request is received from the OLT within a set time.

The traffic flow in the EPON system has two directions, i.e., upstream and downstream, wherein the upstream direction is a direction from the ONU or the ONT to the OLT, and the downstream direction is a direction from the OLT to the ONU or the ONT. In accordance with the present invention, the self-adaptive adjustment of the upstream transmission optical power of the ONU or the ONT in the EPON system is achieved, and the ONU or the ONT can autonomously and quickly adjust the transmission optical power to a degree fitting the upstream data transmission. On one hand, the quality of upstream communication is effectively guaranteed; on the other hand, unnecessary optical power consumption is effectively reduced, so that power is saved.

BRIEF DESCRIPTION OF THE DRAWINGS

Drawings, provided for further understanding of the present invention and forming a part of the specification, are used to explain the present invention together with embodiments of the present invention rather than to limit the present invention, wherein:

FIG. 6 is a structure diagram of an optical power adjustment message frame in an embodiment of the present invention;

FIG. 7 is a structure diagram of an optical power inquiry message frame in an embodiment of the present invention;

DETAILED DESCRIPTION OF THE EMBODIMENTS

The present invention will be described in details below with reference to drawings and embodiments. It should be noted that, embodiments in the application and features in the embodiments can be combined if not conflicted.

Figure 1:
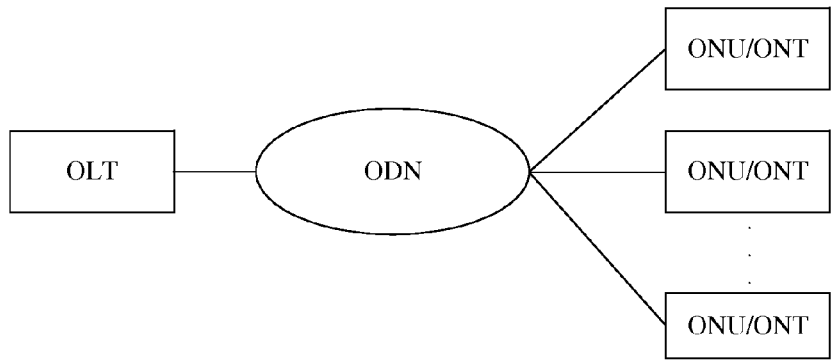
FIG. 1 is a structure diagram of an EPON system in the conventional art.
Figure 2:
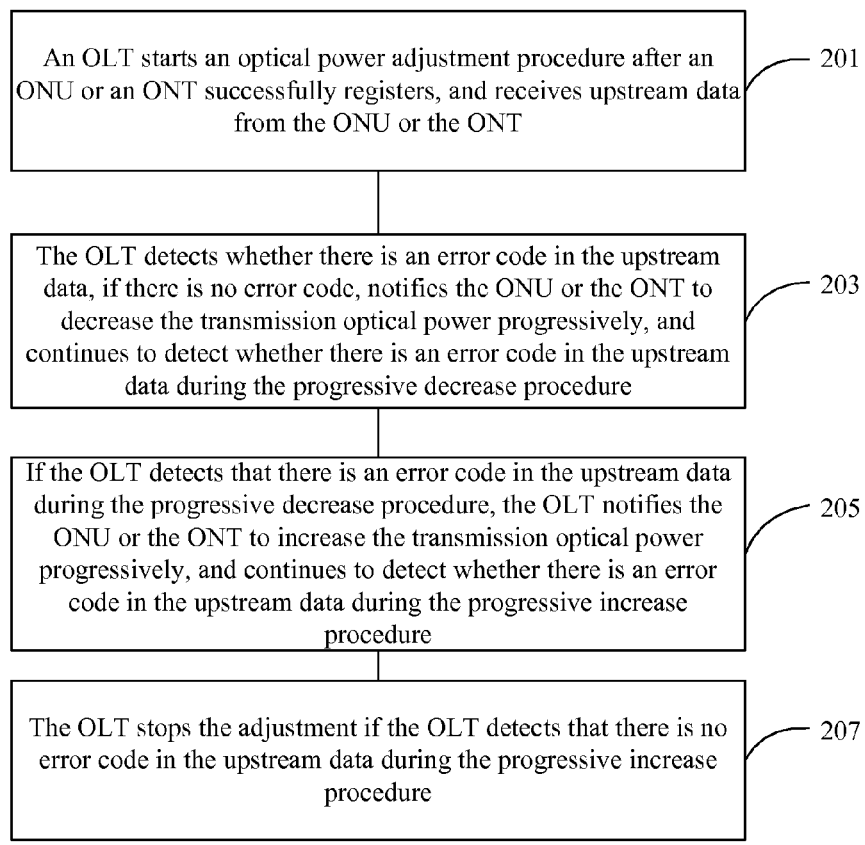
FIG. 2 is a flow chart of Embodiment 1 of an optical power adjustment method for an EPON system in the present invention.

With reference to FIG. 2, a flow chart of Embodiment 1 of an optical power adjustment method for an EPON system in the present invention is shown, which specifically comprises the steps as follows.

Step 201: An OLT starts an optical power adjustment procedure after an ONU or an ONT successfully registers, and receives upstream data from the ONU or the ONT.

Step 203: The OLT detects whether there is an error code in the upstream data, if there is no error code, notifies the ONU or the ONT to decrease the transmission optical power progressively, and continues to detect whether there is an error code in the upstream data during the progressive decrease procedure.

The OLT notifies the ONU or the ONT to decrease the transmission optical power progressively via an optical power adjustment message frame. In the embodiment, the OLT notifies the ONU or the ONT to decrease the current transmission optical power progressively via an extended Operation, Administration and Maintenance Protocol Data Unit (OAM PDU) frame. The extended OAM PDU frame is a new optical power adjustment OAM PDU frame formed by extending the OAM PDU frame format in Section 57.4.2 in IEEE 802.3ah protocol. FIG. 6 is a structure diagram of an optical power adjustment OAM PDU frame, a packet length of the frame is 64 bytes, the value of a Code field is 05 (the value of the Code filed can be flexibly set according to practical situation), and the first byte of a Data field represents an optical power level. It should be noted that, those skilled in the art can set the optical power adjustment message frame correspondingly according to different operators providing services with reference to the structure of the OAM PDU frame shown in FIG. 6, to which no restriction is given in the present invention.

During a progressive decrease procedure, the OLT continues to detect whether there is an error code in the upstream data.

Step 205: If the OLT detects that there is an error code in the upstream data during the progressive decrease procedure, the OLT notifies the ONU or the ONT to increase the transmission optical power progressively, and continues to detect whether there is an error code in the upstream data during a progressive increase procedure.

During the progressive decrease procedure, the OLT continues to detect whether there is an error code in the upstream data, if there is no error code, continues to decrease the transmission optical power of the ONU or the ONT progressively and continues to detect whether there is an error code in the upstream data; if there is an error code, notifies the ONU or the ONT to increase the transmission optical power progressively.

The OLT notifies the ONU or the ONT to increase the transmission optical power progressively via an optical power adjustment message frame. The optical power adjustment message frame can be an optical power adjustment OAM PDU frame shown in FIG. 6.

During the progressive increase procedure, the OLT continues to detect whether there is an error code in the upstream data.

Step 207: The OLT stops the adjustment if the OLT detects that there is no error code in the upstream data during the progressive increase procedure.

When the transmission optical power of the ONU or the ONT fits the transmission optical power required by upstream data transmission, there is no error code in the upstream data, the OLT stops the adjustment of the transmission optical power and sets the transmission optical power as the current transmission optical power, and the ONU or the ONT transmits the upstream data at the transmission optical power.

Figure 3:
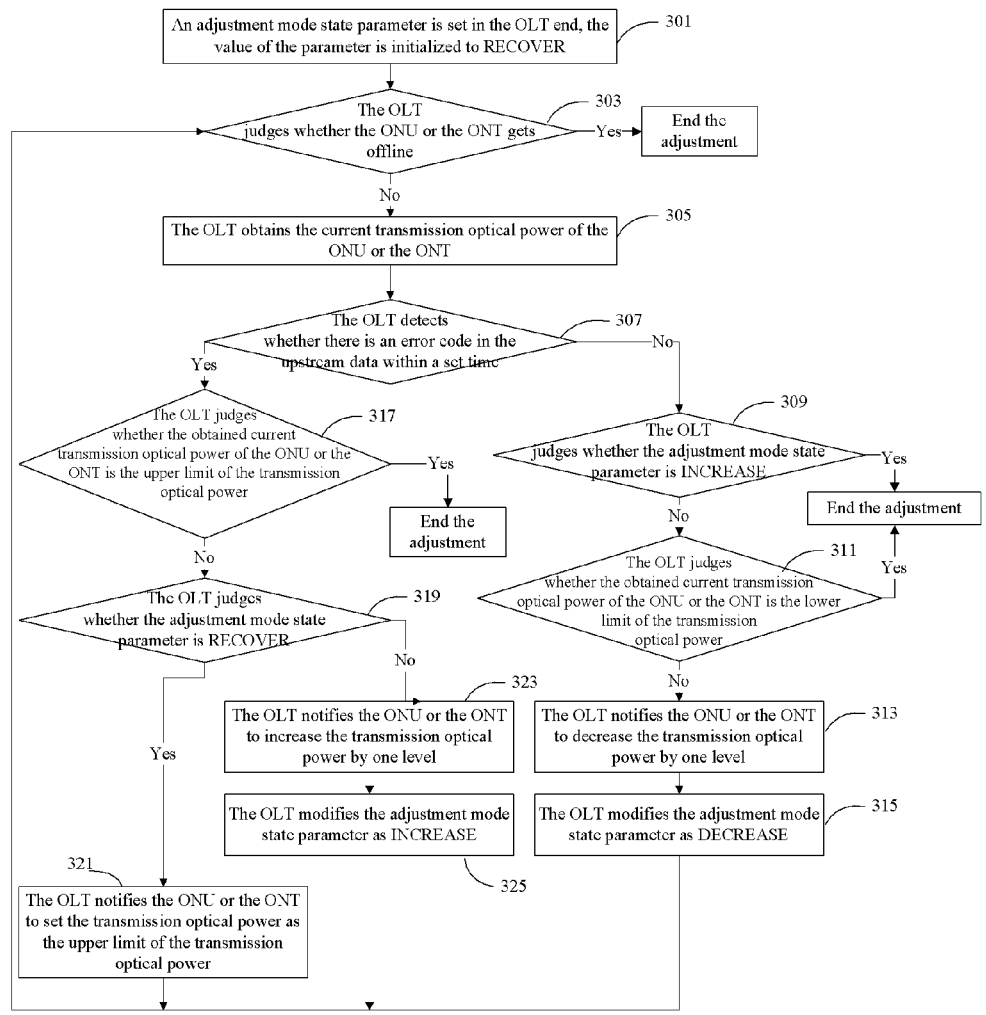
FIG. 3 is a flow chart of Embodiment 2 of an optical power adjustment method for an EPON system in the present invention.

With reference to FIG. 3, a flow chart of Embodiment 2 of an optical power adjustment method for an EPON system in the present invention is shown, which specifically comprises the steps as follows.

Step 301: An adjustment mode state parameter is set in the OLT end, and the value of the adjustment mode state parameter is initialized to RECOVER.

The adjustment mode state parameter comprises: RECOVER, INCREASE and DECREASE.

Step 303: The OLT judges whether the ONU or the ONT gets offline, if so, ends the adjustment; if not, turns to Step 305.

The OLT judges whether the ONU or the ONT gets offline, if the ONU or the ONT gets offline, end the adjustment; otherwise, turns to Step 305.

Step 305: The OLT obtains a current transmission optical power of the ONU or the ONT.

Figure 5:
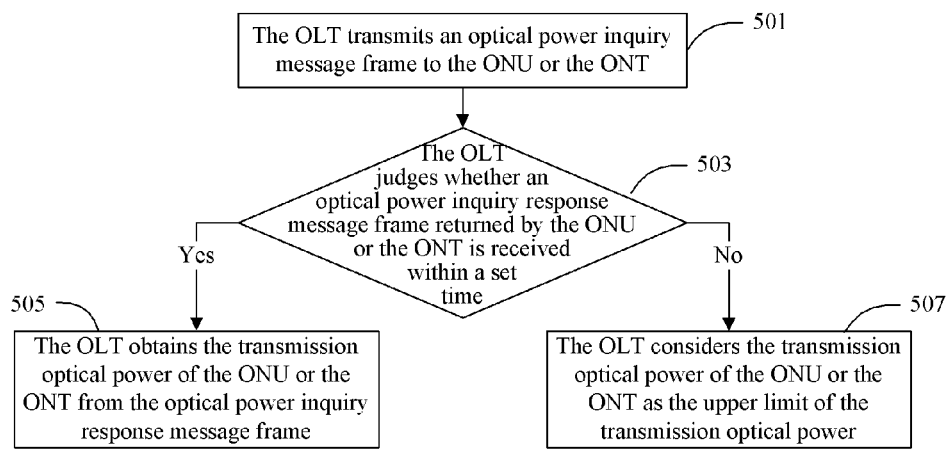
FIG. 5 is a flow chart of an embodiment of a method that the OLT obtains the current transmission optical power of the ONU or the ONT in the present invention.

The OLT can obtain the current transmission optical power of the ONU or the ONT via a transmission optical power inquiry frame, the specific implementation way can refer to the embodiment shown in FIG. 5.

Step 307: The OLT detects whether there is an error code in the upstream data within a set time, if not, turns to Step 309; if so, turns to Step 317.

The set time can be set properly by those skilled in the art according to practical situation.

Step 309: The OLT judges whether the adjustment mode state parameter is INCREASE, if so, ends the adjustment; if not, turns to Step 311.

In a case that there is no error code in the upstream data and it is unnecessary to increase the transmission optical power of the ONU or the ONT, the OLT ends the adjustment; otherwise, if the adjustment mode state parameter is RECOVER or DECREASE, continues to execute the following steps.

Step 311: The OLT judges whether the obtained current transmission optical power of the ONU or the ONT is a lower limit of the transmission optical power, if so, ends the adjustment; if not, turns to Step 313.

In a case that there is no error code in the upstream data, if the current transmission optical power has been the lower limit of the transmission optical power of the ONU or the ONT, there is no decrease scope, the OLT ends the adjustment; otherwise, continues to execute the following steps.

Step 313: The OLT notifies the ONU or the ONT to decrease the transmission optical power by one level.

The OLT can notify the ONU or the ONT to decrease the transmission optical power by one level via the optical power adjustment OAM PDU frame shown in FIG. 6.

Step 315: The OLT modifies the adjustment mode state parameter as DECREASE, and returns to Step 303.

Step 317: The OLT judges whether the obtained current transmission optical power of the ONU or the ONT is an upper limit of the transmission optical power, if so, ends the adjustment; if not, turns to Step 319.

In a case that there is an error code in the upstream data, if the current transmission optical power has been the upper limit of the transmission optical power of the ONU or the ONT, it is unnecessary to increase the transmission optical power, the OLT ends the adjustment; otherwise, continues to execute the following steps.

Step 319: The OLT judges whether the adjustment mode state parameter is RECOVER, if so, turns to Step 321; if not, turns to Step 323.

Step 321: The OLT notifies the ONU or the ONT to set the transmission optical power as the upper limit of the transmission optical power, and returns to Step 303.

Step 323: The OLT notifies the ONU or the ONT to increase the transmission optical power by one level.

Step 325: The OLT modifies the adjustment mode state parameter as INCREASE, and returns to Step 303.

It should be noted that, the ONU or the ONT stores the adjusted transmission optical power in its own storage medium after finishing the adjustment of transmission optical power each time; after the ONU or the ONT is powered-off and then powered-on again, it inquires the stored transmission optical power value from the storage medium, if the transmission optical power value is obtained, the current transmission optical power is set as the stored transmission optical power value, otherwise, the current transmission optical power is set as the upper limit of the transmission optical power.

After the ONU or the ONT is powered-on, the current transmission optical power is set as the stored last adjusted transmission optical power. Because the transmission optical power required for this time of upstream data transmission and the transmission optical power required for last time of upstream data transmission may have very little difference in value, the stored adjusted transmission optical power can meet the requirement of this time of upstream data transmission, so that the optical power adjustment probability is reduced, or the adjustment procedure is shortened, the system resources are saved, and the system efficiency is improved. If no stored adjusted transmission optical power of the ONU or the ONT is obtained after the ONU or the ONT is powered-on, the current transmission optical power is set as the upper limit of the transmission optical power of the ONU or the ONT.

Figure 4:
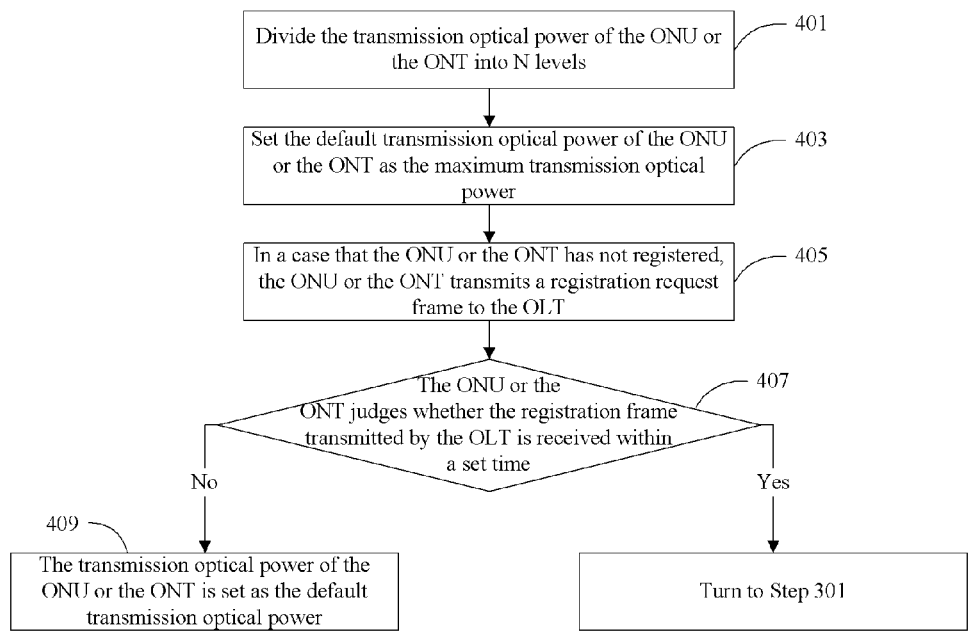
FIG. 4 is a flow chart of Embodiment 3 of an optical power adjustment method for an EPON system in the present invention.

With reference to FIG. 4, a flow chart of Embodiment 3 of an optical power adjustment method for an EPON system in the present invention is shown. The embodiment is based on Embodiment 2 shown in FIG. 3, and the main difference lies in the division of the transmission optical power level of the ONU or the ONT and the registration procedure of the ONU or the ONT to the OLT before Step 301. The repeated part with Embodiment 2 will not be described again here.

Specifically, the embodiment comprises the steps as follows.

Step 401: The transmission optical power of the ONU or the ONT is divided into N levels.

The transmission optical power of the ONU or the ONT can be divided by those skilled in the art with proper methods according to actual demands. In the embodiment, the transmission optical power is divided into N levels according to the transmission optical power range of the ONU or the ONT, wherein N is a natural number. It is assumed that the $(N-1)^{th}$ level is the minimum transmission optical power, the $0^{th}$ level is the maximum transmission optical power, the corresponding optical power difference between two adjacent levels is equal, and in the embodiment, the difference is set as 2 db.

Step 403: The default transmission optical power of the ONU or the ONT is set as the maximum transmission optical power.

The default transmission optical power of the ONU or the ONT is set as the maximum transmission optical power, so that the quality of transmission can be guaranteed and the speed of transmission also can be guaranteed when the ONU or the ONT transmits data at the default transmission optical power. Of course, those skilled in the art also can employ other proper settings, to which no restriction is given in the present invention.

Step 405: In a case that the ONU or the ONT has not registered, the ONU or the ONT transmits a registration request frame to the OLT.

Step 407: The ONU or the ONT judges whether a registration frame transmitted by the OLT is received within a set time, if not, turns to Step 409; if so, turns to Step 301.

If the registration frame is not received, it means that registration of the ONU or the ONT to the OLT is unsuccessful, then Step 409 is executed. If the registration frame is received, it means that registration of the ONU or the ONT to the OLT is successful, then turn to Step 301 in Embodiment 2 shown in FIG. 3, and steps in Embodiment 2 are executed continuously, so as to adjust the transmission optical power.

Step 409: The transmission optical power of the ONU or the ONT is set as the default transmission optical power.

In the embodiment, the transmission optical power of the ONU or the ONT is set as the $0^{th}$ level, so as to ensure that the ONU or the ONT registers successfully in a fast speed. Of course, when the default transmission optical power is not the $0^{th}$ level, the default transmission optical power may be not used, instead, the transmission optical power is directly set as the maximum transmission optical power, i.e., the $0^{th}$ level of transmission optical power.

With reference to FIG. 5, a flow chart of an embodiment of a method that the OLT obtains the current transmission optical power of the ONU or the ONT in the present invention is shown, which specifically comprises the steps as follows.

Step 501: The OLT transmits an optical power inquiry message frame to the ONU or the ONT.

The OLT can transmit a plurality of optical power inquiry message frames to the ONU or the ONT, so as to avoid packet loss during the data transmission, and ensure that the ONU or the ONT can receive the optical power inquiry message frame.

The optical power inquiry message frame in the embodiment employs a structure as shown in FIG. 7. The frame is an optical power inquiry OAM PDU frame formed by extending the OAM PDU frame format in Section 57.4.2 in IEEE 802.3ah protocol, the packet length thereof is 64 bytes, and the value of the Code field is 06.

Step 503: The OLT judges whether an optical power inquiry response message frame returned by the ONU or the ONT is received within a set time, if so, turns to Step 505; if not, turns to Step 507.

The OLT judges whether a response frame returned by the ONU or the ONT as a response to the optical power inquiry message frame within a set time, and obtains the transmission optical power of the ONU or the ONT according to the judgment result.

Step 505: The OLT obtains the transmission optical power of the ONU or the ONT from the optical power inquiry response message frame.

After receiving the optical power inquiry message frame from the OLT, the ONU or the ONT fills the current transmission optical power into the optical power inquiry response message frame, and sends the optical power inquiry response message frame to the OLT.

Figures 8, 9:
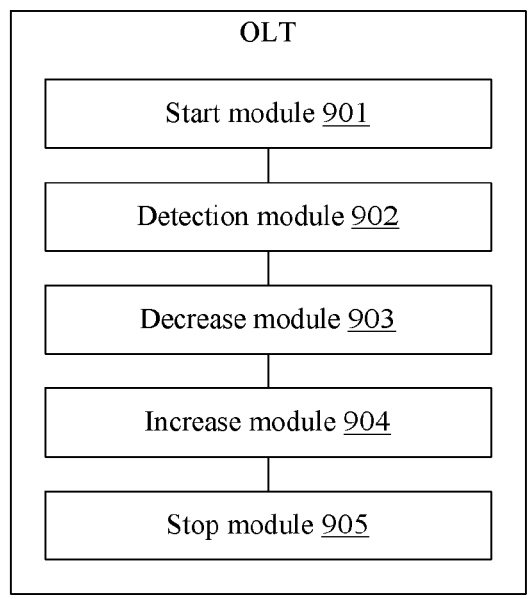
FIG. 8 is a structure diagram of an optical power inquiry response message frame in an embodiment of the present invention.
FIG. 9 is a structure block diagram of an OLT in an embodiment of the present invention.

The optical power inquiry response message frame in the embodiment employs a structure as shown in FIG. 8. The frame is an optical power inquiry response OAM PDU frame formed by extending the OAM PDU frame format in Section 57.4.2 in IEEE 802.3ah protocol, the packet length thereof is 64 bytes, the value of the Code field is 07, and the first byte of the Data field represents the optical power level.

Step 507: The OLT considers the transmission optical power of the ONU or the ONT as the upper limit of the transmission optical power.

When the optical power inquiry response message frame is not received, the OLT directly sets the transmission optical power of the ONU or the ONT as the upper limit of the transmission optical power. On one hand, the requirement of the transmission optical power is met; on the other hand, the resource waste and low system efficiency caused by repeated initiation of inquiry are also avoided.

With reference to FIG. 9, a structure block diagram of an OLT in an embodiment of the present invention is shown, which specifically comprises:

a start module 901, configured to start an optical power adjustment procedure after an ONU or an ONT successfully registers;

a detection module 902, configured to detect whether there is an error code in upstream data from the ONU or the ONT during the optical power adjustment procedure; and detect whether there is an error code in the upstream data during a progressive decrease procedure and a progressive increase procedure;

a decrease module 903, configured to notify the ONU or the ONT to decrease the transmission optical power progressively if there is no error code in the upstream data;

an increase module 904, configured to notify the ONU or the ONT to increase the transmission optical power progressively if the detection module detects that there is an error code in the upstream data during the progressive decrease procedure; and a stop module 905, configured to stop the adjustment if the detection module detects that there is no error code in the upstream data during the progressive increase procedure.

Preferably, an adjustment mode state parameter is set in the OLT, wherein the adjustment mode state parameter comprises RECOVER, INCREASE and DECREASE.

Moreover, the OLT can further comprise:

an initialization module, configured to: before the OLT starts the optical power adjustment procedure after the ONU or the ONT registers successfully, initialize the adjustment mode state parameter to RECOVER;

an optical power obtaining module, configured to obtain a current transmission optical power of the ONU or the ONT before the detection module detects whether there is an error code in the upstream data from the ONU or the ONT;

a transmitting-at-upper-limit module, configured to set the transmission optical power of the ONU or the ONT as an upper limit of the transmission optical power, in a case that the ONU or the ONT has not registered and transmits a registration request to the OLT and no response to the registration request is received from the OLT within a set time.

Preferably, the decrease module 903 of the OLT can comprise:

a first decrease module, configured to notify the ONU or the ONT to decrease the transmission optical power by one level and set the adjustment mode state parameter as DECREASE, when there is no error code in the upstream data, the adjustment mode state parameter is not INCREASE, and the current transmission optical power of the ONU or the ONT is not a lower limit of the transmission optical power of the ONU or the ONT; and a second decrease module, configured to stop the adjustment, when there is no error code in the upstream data, the adjustment mode state parameter is not INCREASE, and the current transmission optical power of the ONU or the ONT is the lower limit of the transmission optical power of the ONU or the ONT.

Preferably, the increase module 904 can comprise:

a first increase module, configured to notify the ONU or the ONT to increase the transmission optical power by one level and set the adjustment mode state parameter as INCREASE, when there is an error code in the upstream data, the current transmission optical power of the ONU or the ONT is not the upper limit of the transmission optical power of the ONU or the ONT, and the adjustment mode state parameter is not RECOVER;

a second increase module, configured to stop the adjustment, when there is an error code in the upstream data and the current transmission optical power of the ONU or the ONT is the upper limit of the transmission optical power of the ONU or the ONT; and a third increase module, configured to notify the ONU or the ONT to adjust the current transmission optical power to the upper limit of the transmission optical power, when there is an error code in the upstream data, the current transmission optical power of the ONU or the ONT is not the upper limit of the transmission optical power of the ONU or the ONT, and the adjustment mode state parameter is RECOVER.

Preferably, the stop module 905 can comprise:

a first stop module, configured to stop the adjustment when there is no error code in the upstream data and the adjustment mode state parameter is INCREASE.

The adjustment mode state parameter, which comprises RECOVER, INCREASE and DECREASE, is set in the OLT. The initialization module initializes the adjustment mode state parameter as RECOVER after the ONU or the ONT registers successfully. The start module 904 starts the optical power adjustment procedure. The detection module 902 detects whether there is an error code in the upstream data from the ONU or the ONT during the optical power adjustment procedure. If there is no error code, the decrease module 903 notifies the ONU or the ONT to decrease the transmission optical power progressively. During this procedure, the detection module 902 continues to detect whether there is an error code in the upstream data from the ONU or the ONT, if no error code appears in the upstream data during the progressive decrease procedure, the stop module 905 stops the adjustment of the transmission optical power, otherwise, the increase module 904 progressively increases the transmission optical power until there is no error code or until the transmission optical power reaches the upper limit of the transmission optical power.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. An optical power adjustment method for an Ethernet Passive Optical Network (EPON) system, comprising:
   an Optical Line Terminal (OLT) starting an optical power adjustment procedure after an Optical Network Unit (ONU) or an Optical Network Terminal (ONT) successfully registers;
   during the optical power adjustment procedure, the OLT detecting whether there is an error code in upstream data from the ONU or the ONT;
   if there is no error code, notifying the ONU or the ONT to decrease a transmission optical power progressively, and during a progressive decrease procedure, the OLT continuing to detect whether there is an error code in the upstream data;
   if the OLT detects that there is an error code in the upstream data during the progressive decrease procedure, notifying the ONU or the ONT to increase the transmission optical power progressively, and during a progressive increase procedure, the OLT continuing to detect whether there is an error code in the upstream data; and
   if the OLT detects that there is no error code in the upstream data during the progressive increase procedure, the OLT stopping an adjustment;
   further comprising:
      in a case that the ONU or the ONT has not registered and transmits a registration request to the OLT, judging whether a response to the registration request is received from the OLT within a set time; and
      if not, setting the transmission optical power of the ONU or the ONT as an upper limit of the transmission optical power.

2. The method according to claim 1, wherein an adjustment mode state parameter is set in the OLT, wherein the adjustment mode state parameter comprises: RECOVER, INCREASE and DECREASE.

3. The method according to claim 2, wherein before the step of the OLT starting the optical power adjustment procedure after the ONU or the ONT successfully registers, the method further comprises: initializing the adjustment mode state parameter to RECOVER.

4. The method according to claim 2, wherein before the step of the OLT detecting whether there is an error code in the upstream data from the ONU or the ONT, the method further comprises a step of obtaining a current transmission optical power of the ONU or the ONT, and the step comprises:
   the OLT transmitting an optical power inquiry frame to the ONU or the ONT;
   receiving an optical power inquiry response frame returned by the ONU or the ONT; and
   obtaining the current transmission optical power of the ONU or the ONT from the optical power inquiry response frame.

5. The method according to claim 4, further comprising:
   if no optical power inquiry response frame is received from the ONU or the ONT within a set time, then determining the current transmission optical power of the ONU or the ONT as an upper limit of the transmission optical power.

6. The method according to claim 4, wherein before the step of obtaining the current transmission optical power of the ONU or the ONT, the method further comprises:
   the OLT stopping the adjustment if detecting that the ONU or the ONT gets offline.

7. The method according to claim 4, wherein the step of notifying the ONU or the ONT to decrease the transmission optical power progressively if there is no error code comprises:
   if the OLT judges that there is no error code in the upstream data, judges that the adjustment mode state parameter is not INCREASE, and judges that the current transmission optical power of the ONU or the ONT is not a lower limit of the transmission optical power of the ONU or the ONT, then the OLT notifying the ONU or the ONT to decrease the transmission optical power by one level, and setting the adjustment mode state parameter as DECREASE;
   if the OLT judges that there is no error code in the upstream data, judges that the adjustment mode state parameter is not INCREASE, and judges that the current transmission optical power of the ONU or the ONT is the lower limit of the transmission optical power of the ONU or the ONT, then the OLT stopping the adjustment.

8. The method according to claim 4, wherein the step of notifying the ONU or the ONT to increase the transmission optical power progressively if the OLT detects that there is an error code in the upstream data during the progressive decrease procedure comprises:
   if the OLT detects that there is an error code in the upstream data, and judges that the current transmission optical power of the ONU or the ONT is not an upper limit of the transmission optical power of the ONU or the ONT and the adjustment mode state parameter is not RECOVER, then the OLT notifying the ONU or the ONT to increase the transmission optical power by one level, and setting the adjustment mode state parameter as INCREASE;
   if the OLT detects that there is an error code in the upstream data and judges that the current transmission optical power of the ONU or the ONT is the upper limit of the transmission optical power of the ONU or the ONT, then the OLT stopping the adjustment;
   if the OLT detects that there is an error code in the upstream data, and judges that the current transmission optical power of the ONU or the ONT is not the upper limit of the transmission optical power of the ONU or the ONT and the adjustment mode state parameter is RECOVER, then the OLT notifying the ONU or the ONT to adjust the current transmission optical power to the upper limit of the transmission optical power.

9. The method according to claim 4, wherein the step of the OLT stopping the adjustment if the OLT detects that there is no error code in the upstream data during the progressive increase procedure comprises:
   if the OLT detects that there is no error code in the upstream data and judges that the adjustment mode state parameter is INCREASE, then the OLT stopping the adjustment.

10. The method according to claim 1, further comprising:
storing the adjusted transmission optical power of the ONU or the ONT; and
after the ONU or the ONT is powered-on, setting a current transmission optical power of the ONU or the ONT as the stored transmission optical power.

11. The method according to claim 10, further comprising:
if the stored adjusted transmission optical power of the ONU or the ONT cannot be obtained after the ONU or the ONT is powered-on, setting the current transmission optical power of the ONU or the ONT as an upper limit of the transmission optical power.

12. An OLT, comprising:
a start module, configured to start an optical power adjustment procedure after an ONU or an ONT successfully registers;
a detection module, configured to detect whether there is an error code in upstream data from the ONU or the ONT during the optical power adjustment procedure; and detect whether there is an error code in the upstream data during a progressive decrease procedure and a progressive increase procedure;
a decrease module, configured to notify the ONU or the ONT to decrease the transmission optical power progressively if there is no error code in the upstream data;
an increase module, configured to notify the ONU or the ONT to increase the transmission optical power progressively if the detection module detects that there is an error code in the upstream data during the progressive decrease procedure; and
a stop module, configured to stop an adjustment if the detection module detects that there is no error code in the upstream data during the progressive increase procedure;
further comprising:
a transmitting-at-upper-limit module, configured to set the transmission optical power of the ONU or the ONT as an upper limit of the transmission optical power, in a case that the ONU or the ONT has not registered and transmits a registration request to the OLT and no response to the registration request is received from the OLT within a set time.

13. The OLT according to claim 12, wherein an adjustment mode state parameter is set in the OLT, wherein the adjustment mode state parameter comprises: RECOVER, INCREASE and DECREASE.

14. The OLT according to claim 13, further comprising:
an optical power obtaining module, configured to obtain a current transmission optical power of the ONU or the ONT before the detection module detects whether there is an error code in the upstream data from the ONU or the ONT.

15. The OLT according to claim 14, wherein the decrease module comprises:
a first decrease module, configured to: when there is no error code in the upstream data, the adjustment mode state parameter is not INCREASE, and the current transmission optical power of the ONU or the ONT is not a lower limit of the transmission optical power of the ONU or the ONT, notify the ONU or the ONT to decrease the transmission optical power by one level and set the adjustment mode state parameter as DECREASE; and
a second decrease module, configured to: when there is no error code in the upstream data, the adjustment mode state parameter is not INCREASE, and the current transmission optical power of the ONU or the ONT is the lower limit of the transmission optical power of the ONU or the ONT, stop the adjustment.

16. The OLT according to claim 14, wherein the increase module comprises:
a first increase module, configured to: when there is an error code in the upstream data, the current transmission optical power of the ONU or the ONT is not an upper limit of the transmission optical power of the ONU or the ONT, and the adjustment mode state parameter is not RECOVER, notify the ONU or the ONT to increase the transmission optical power by one level and set the adjustment mode state parameter as INCREASE;
a second increase module, configured to: when there is an error code in the upstream data and the current transmission optical power of the ONU or the ONT is an upper limit of the transmission optical power of the ONU or the ONT, stop the adjustment; and
a third increase module, configured to: when there is an error code in the upstream data, the current transmission optical power of the ONU or the ONT is not the upper limit of the transmission optical power of the ONU or the ONT, and the adjustment mode state parameter is RECOVER, notify the ONU or the ONT to adjust the current transmission optical power to the upper limit of the transmission optical power.

* * * * *